Figure 1:
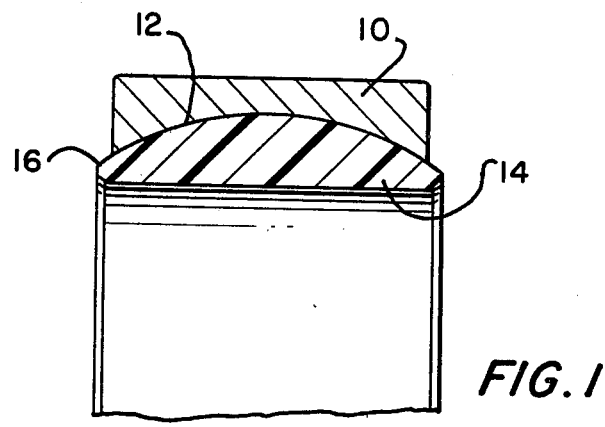

United States Patent [19]

Lobeck et al.

[11] 4,247,512

[45] Jan. 27, 1981

[54] METHOD OF FORMING BALL BUSHING WITH PLASTIC BALL

[75] Inventors: John H. Lobeck; Richard D. Allen, both of South Bend, Ind.

[73] Assignee: The Torrington Company, Torrington, Conn.

[21] Appl. No.: 79,971

[22] Filed: Sep. 28, 1979

[51] Int. Cl.³ .............................................. B29F 1/10
[52] U.S. Cl. ..................................... 264/242; 264/264
[58] Field of Search ................................ 264/242, 264

[56] References Cited

U.S. PATENT DOCUMENTS

| | | | |
|---|---|---|---|
| 3,218,383 | 11/1965 | White | 264/242 |
| 3,941,495 | 2/1976 | Duncan | 264/242 |

Primary Examiner—James H. Derrington
Attorney, Agent, or Firm—Frank S. Troidl

[57] ABSTRACT

An annular metal outer race with a concave bore is placed in an outer mold. A pair of coaxial annular inner molds are inserted into the outer race. Liquid plastic is flowed into an annular space between the inner molds and the outer race. The liquid plastic is allowed to solidify and shrink whereby a clearance between the plastic ball outside diameter and the outer race is provided.

2 Claims, 2 Drawing Figures

METHOD OF FORMING BALL BUSHING WITH PLASTIC BALL

This invention relates to bearings. More particularly, this invention is a method for making a ball bushing with a non-removable plastic ball.

The conventional method of making a ball bushing is to fracture the outer race and place the ball within the fractured outer race. The location and shape of the fracture must be highly controlled, and requires an extra step which would be eliminated by successful methods of making a ball bushing without fracturing.

One method of forming a bearing assembly without fracturing the outer race is shown in U.S. Pat. No. 3,993,369 granted Nov. 23, 1976, to McCloskey. However, that bearing assembly requires that the plastic inner member be deformable. Because the inner member is deformable, the plastic material which must be used is not suitable for a ball bushing which must sustain any substantial degree of loading.

With our new method of forming a ball bushing, the ball bushing is made without fracturing the outer race. The plastic material may be chosen to satisfy the particular engineering requirements. The plastic ball may be deformable like the plastic ball of the McCloskey U.S. Pat. No. 3,993,369; however, the plastic ball may also be non-deformable to satisfy high load requirements.

Briefly described, this new method of forming a ball bushing comprises fitting an annular metal annular race having a concave bore into an outer mold body. A pair of coaxial inner molds having the same outside diameters are inserted into the annular metal outer race. The outside of each inner mold has an annular recess extending from one end so that the inserted inner mold recesses and the concave bore of the outer race provide an annular space corresponding in shape to the shape of the desired plastic ball. Liquid plastic is flowed through passage means in at least one of the inner molds and into the annular space to fill the annular space with liquid plastic. The liquid plastic is allowed to solidify and shrink by cooling whereby a clearance between the plastic ball outside diameter and the metal outer race bore is provided.

Figure 2:
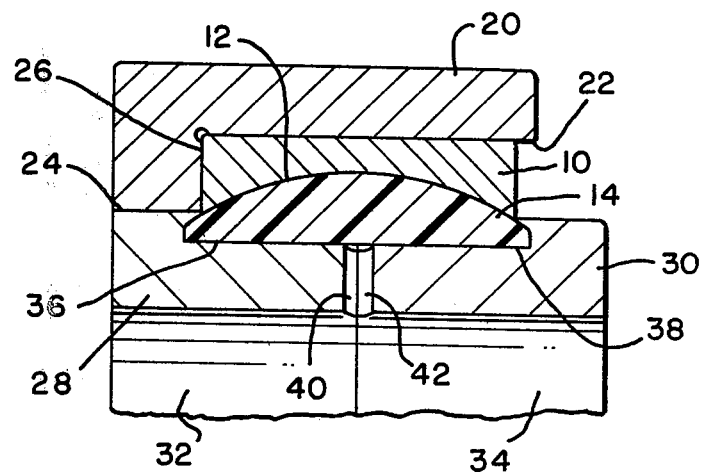

The invention, as well as its many advantages, may be further understood by reference to the following detailed description and drawings in which:

FIG. 1 is a fragmentary sectional view of a ball bushing made in accordance with the invention; and FIG. 2 is a fragmentary sectional view illustrating the new method of forming the plastic ball bushing.

In the various figures, like parts are referred to by like numbers.

Referring to the drawings and more particularly to FIG. 1, the ball bushing includes an annular metal outer race 10. The outer race 10 has a concave bore 12 in which is located a plastic ball 14 having a spherical or convex outer edge 16 conforming to the concave bore 12 of the outer race 10.

The ball bushing is made by the method illustrated in FIG. 2. The apparatus for making the ball bushing includes an outer annular mold body 20. The mold body 20 has a bore 22 extending from one end and a bore 24 of less diameter than bore 22 extending from the outer end thus providing a radially extending shoulder 26.

The annular metal outer race 10 is slipped into the bore 22 of the outer mold body 20 until an end of the annular metal outer race 10 contacts shoulder 26.

The coaxial annular inner molds 28 and 30 are then sequentially inserted into the outer mold 20 and the outer race 10, mold 28 being first inserted from the left, looking at FIG. 2, and then mold 30 being inserted from the right. The bores 32 and 34 of inner molds 28 and 30 respectively have the same radius. The outside diameters of the inner molds 28 and 30 and the diameter of bore 24 are equal.

Annular recesses 36 and 38 extend from the adjoing ends of inner molds 28 and 30, respectively. Thus, the inner mold recesses 36 and 38 and the concave bore 12 of outer race 10 provide an annular space corresponding in shape to the shape of the plastic ball 14.

In order to get the liquid plastic into the annular space at least one passage way must be provided in at least one of the inner molds so that the annular space may be filled with the liquid plastic. In the embodiment shown in FIG. 2, each inner mold 28 and 30 is provided with a semi-circular groove 40 and 42 respectively so that when the inner mold 28 and 30 are in place, grooves 40 and 42 form a radial cylindrical passage extending from bores 32 and 34 to the space formed by recesses 36 and 38, and concave bore 12.

In operation, the outer race 10 is slip fit into the outer mold 20. Inner mold 28 is inserted. Thereafter, the inner mold 30 is inserted to provide the annular space having the same shape as the shape of the completed plastic ball 14. Plastic in liquid form is flowed through the bores 32 and 34, radially outwardly through the radial passage formed by grooves 40 and 42 to fill the annular space formed by recesses 36, 38 and bore 12. The liquid plastic is then allowed to solidify and shrink by cooling at normal temperature. After cooling to normal temperature, since the plastic ball has greater shrinkage then the metal outer race, a clearance will be provided between the plastic ball outside surface and the outer race bore.

To remove the completed ball bushing, the inner mold 30 is first removed and then ball 14 and outer race 12 are removed from the mold.

This new ball bushing is made without fracturing the outer race. All kinds of plastic may be used including not only deformable plastic but also plastic having physical properties suitable for use in high load requirements.

I claim:

1. A method of forming a ball bushing comprising: fitting into an outer mold body an annular metal outer race with a concave bore; inserting a pair of coaxial annular inner molds into said outer mold body, the coaxial annular inner molds having the same outside diameters, the outside of each inner mold having an annular recess extending from one end thereof so that the inner mold recesses and the concave bore of the outer race provide an annular space corresponding in shape to the shape of the desired plastic ball; flowing liquid plastic through a longitudinal bore in at least one of the inner molds and then radially outwardly through a passage in at least one of the inner molds and into said annular space to fill said annular space with liquid plastic; and allowing the liquid plastic to solidify and shrink by cooling whereby clearance between the plastic ball outside surface and the metal outer race is provided.

2. A method of forming a ball bushing in accordance with claim 1 wherein; the liquid plastic is flowed through coaxial bores in both of the inner molds and radially outwardly through a passage formed by grooves of the inner molds.

* * * * *